US011122183B2

(12) United States Patent
Anami

(10) Patent No.: US 11,122,183 B2
(45) Date of Patent: Sep. 14, 2021

(54) IMAGE READING APPARATUS

(71) Applicant: SEIKO EPSON CORPORATION, Tokyo (JP)

(72) Inventor: Akira Anami, Kitakyushu (JP)

(73) Assignee: Seiko Epson Corporation, Tokyo (JP)

(*) Notice: Subject to any disclaimer, the term of this patent is extended or adjusted under 35 U.S.C. 154(b) by 8 days.

(21) Appl. No.: 16/828,067

(22) Filed: Mar. 24, 2020

(65) Prior Publication Data

US 2020/0314283 A1    Oct. 1, 2020

(30) Foreign Application Priority Data

Mar. 27, 2019  (JP) .............................. JP2019-060196

(51) Int. Cl.
*H04N 1/04* (2006.01)
*H04N 1/12* (2006.01)
*H04N 1/00* (2006.01)

(52) U.S. Cl.
CPC ......... *H04N 1/121* (2013.01); *H04N 1/00013* (2013.01); *H04N 1/00596* (2013.01); *H04N 1/00702* (2013.01); *H04N 1/00745* (2013.01)

(58) Field of Classification Search
CPC ............... H04N 1/121; H04N 1/00013; H04N 1/00596; H04N 1/00702; H04N 1/00745
USPC ................................. 358/498, 496
See application file for complete search history.

(56) References Cited

U.S. PATENT DOCUMENTS

| 2015/0281488 | A1* | 10/2015 | Kawauchi | H04N 1/0057 |
| | | | | 358/1.13 |
| 2017/0094086 | A1* | 3/2017 | Nomoto | H04N 1/00588 |
| 2017/0126911 | A1* | 5/2017 | Kogi | H04N 1/00037 |
| 2017/0374216 | A1* | 12/2017 | Kanamitsu | H04N 1/0057 |
| 2018/0376020 | A1* | 12/2018 | Shiota | G03G 15/70 |
| 2019/0124222 | A1* | 4/2019 | Matsue | H04N 1/00615 |

FOREIGN PATENT DOCUMENTS

JP         2017-95228 A     6/2017

* cited by examiner

*Primary Examiner* — Cheukfan Lee
(74) *Attorney, Agent, or Firm* — Workman Nydegger

(57) ABSTRACT

A scanner includes a feeding unit, a transport unit provided downstream of the feeding unit, and a first reading unit provided downstream of the transport unit, a second reading unit provided to face the first reading unit across the transport path and configured to be displaceable in a direction of advancing and retreating with respect to the first reading unit, a second medium detection portion as detection means for detecting a specific portion provided in the sheet holder for specifying front and back sides of the sheet holder in which the booklet is sandwiched, and a control unit that determines whether or not a reading surface of the sheet holder faces the first reading unit based on the detection information of the second medium detection portion and executes a front/back side determination processing mode for performing processing based on the determination.

9 Claims, 11 Drawing Sheets

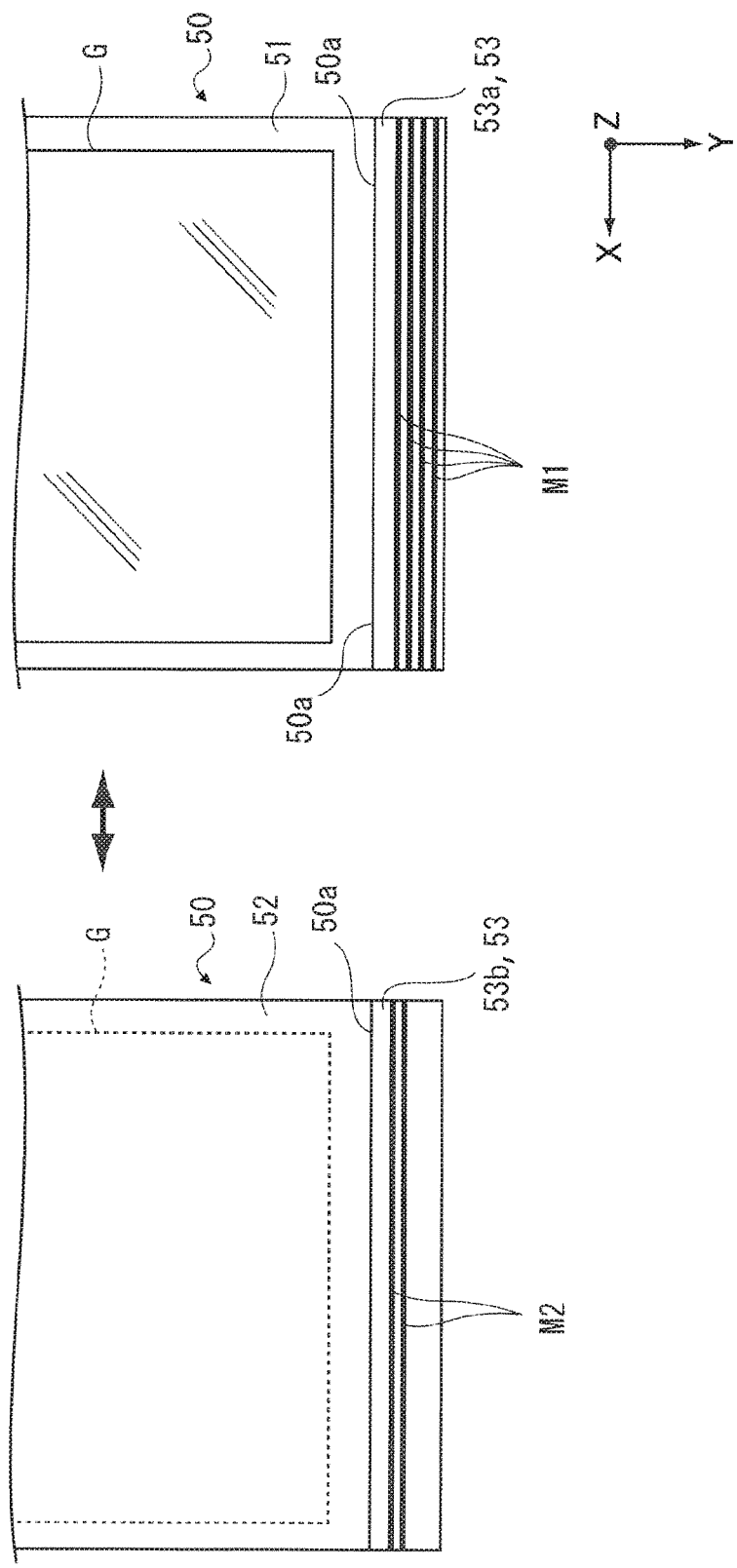

IMAGE READING APPARATUS

The present application is based on, and claims priority from JP Application Serial Number 2019-060196, filed Mar. 27, 2019, the disclosure of which is hereby incorporated by reference herein in its entirety.

BACKGROUND

1. Technical Field

The present disclosure relates to an image reading apparatus that reads a document.

2. Related Art

A document scanner, which is an example of an image reading apparatus, is provided with a feeding device that automatically sends a document, and may be configured to automatically feed and read a plurality of documents. In addition, such a feeding device may be referred to as "auto document feeder" or "ADF" for short. In the image reading apparatus having such a configuration, for example, as disclosed in JP-A-2017-95228, two reading units are disposed to face each other across a document transport path so that both sides can be read by one time of document transport.

The image reading apparatus has a user's need to read a booklet such as a passport or a passbook. When a booklet is opened and sent as it is with a feeding device, the feeding device separates the overlapped pages and tries to send the pages one by one, and in the image reading apparatus described in JP-A-2017-95228, a booklet with a page to be read opened is placed in a transparent sheet holder and sent by the feeding device.

When a first reading unit and the second reading unit are provided as two reading units provided across a transport path, as an example, for example, the first reading unit may be fixed, and the second reading unit may be pressed against the first reading unit and may be provided so as to be displaceable in a direction of advancing and retreating with respect to the first reading unit. With this configuration, the second reading unit moves forward and backward with respect to the first reading unit in accordance with the thickness of the document, thus the document can be brought into close contact with both the first reading unit and the second reading unit, and a good reading image quality can be obtained.

The reading of the booklet placed in the sheet holder is usually single-sided reading for reading a spread surface, and the spread surface is read by either one of the first reading unit and the second reading unit. However, since the booklet is thick and the thickness in the transport direction may not be uniform depending on an opened page, the displaceable second reading unit may be displaced during reading of the booklet. For this reason, the reading image quality is more stable when the booklet placed in the sheet holder is read by the fixed first reading unit. However, the user may set the booklet placed in the sheet holder with a reading surface facing the second reading unit.

SUMMARY

According to an aspect of the present disclosure, there is provided an image reading apparatus including a feeding unit that sends out a medium from a medium mounting portion on which the medium is mounted to a transport path along which the medium is transported, a transport unit that is provided downstream of the feeding unit in a medium transport direction and transports the medium, a first reading unit that is provided downstream of the transport unit in the medium transport direction and reads the medium transported along the transport path, whose position with respect to the transport path is fixed, a second reading unit that is provided to face the first reading unit across the transport path and is configured to be displaceable in a direction of advancing and retreating with respect to the first reading unit to read the medium transported along the transport path, a detection unit that detects a specific portion provided in a sheet holder for specifying front and back sides of the sheet holder in which a booklet is sandwiched, and a control unit that determines whether or not a reading surface in the sheet holder faces the first reading unit based on detection information of the detection unit and executes a front/back side determination processing mode for performing processing based on the determination.

BRIEF DESCRIPTION OF THE DRAWINGS

FIG. 11 is a plan view showing a modification example of the sheet holder.

DESCRIPTION OF EXEMPLARY EMBODIMENTS

Figure 1:
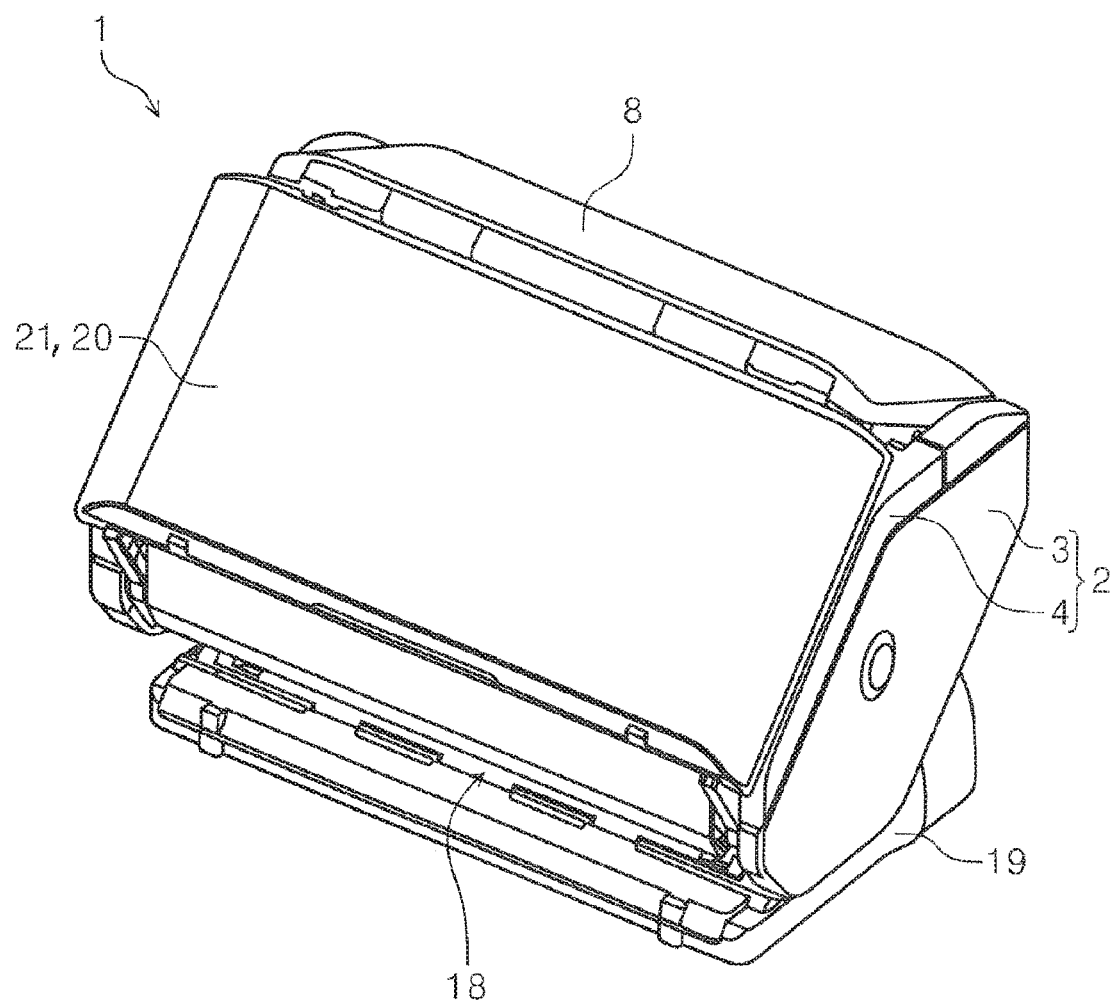
FIG. 1 is an external perspective view of a scanner according to a first embodiment.

Hereinafter, the disclosure will be schematically described. According to a first aspect of the present disclosure, there is provided an image reading apparatus including a feeding unit that sends out a medium from a medium mounting portion on which the medium is mounted to a transport path along which the medium is transported, a transport unit that is provided downstream of the feeding unit in a medium transport direction and transports the medium, a first reading unit that is provided downstream of the transport unit in the medium transport direction and reads the medium transported through the transport path, whose position with respect to the transport path is fixed, a second reading unit that is provided to face the first reading unit across the transport path and is configured to be displaceable in a direction of advancing and retreating with respect to the first reading unit to read the medium transported along the transport path, a detection unit that detects a specific portion provided in a sheet holder for specifying front and back sides of the sheet holder in which a booklet is sandwiched, and a control unit that determines whether or not a reading surface in the sheet holder faces the first reading unit based on detection information of the detection unit and executes a front/back side determination processing mode for performing processing based on the determination.

According to this aspect, there are provided the detection unit that detects the specific portion for specifying front and back sides of the sheet holder in which the booklet is sandwiched, and the control unit that determines whether or not the reading surface in the sheet holder faces the first reading unit based on the detection information of the detection unit and executes a front/back side determination processing mode for performing processing based on the determination, thus it is possible to obtain a good reading result by performing appropriate processing according to the front and back sides of the sheet holder.

In a second aspect of the image reading apparatus according to the first aspect, the control unit executes reading by the first reading unit when the reading surface faces the first reading unit in the front/back side determination processing mode, and performs abnormality processing when the reading surface does not face the first reading unit.

According to this aspect, the control unit executes reading by the first reading unit when the reading surface faces the first reading unit in the front/back side determination processing mode, and performs abnormality processing when the reading surface does not face the first reading unit, thus it is possible to make the user aware that the sheet holder has been set in an orientation in which the booklet is read by the second reading unit that can be displaced.

In a third aspect of the image reading apparatus according to the first or second aspect, the control unit includes a first transport mode in which driving of the feeding unit is stopped when transport of the medium by the transport unit is started after the medium is sent out by the feeding unit to the transport path, and a second transport mode in which driving of the feeding unit is continued for a predetermined period after the transport of the medium by the transport unit is started after the medium is sent out to the transport path by the feeding unit, and performs the front/back side determination processing mode when the second transport mode is executed.

When a plurality of media are mounted on the medium mounting portion and the plurality of media are separated and fed one by one, the first transport mode is a transport mode in which the medium can be suitably separated and transported. The second transport mode is a transport mode in which the transport by the transport unit can be assisted by driving the feeding unit for a medium having a thickness such as the sheet holder. Therefore, the sheet holder can be appropriately transported downstream by the second transport mode.

In a fourth aspect of the image reading apparatus according to the third aspect, the transport unit includes a driving roller driven by a driving source, a driven roller that rotates following rotation of the driving roller, and a transport load adjusting unit that adjusts a transport load which is a load by which the driven roller is pressed toward the driving roller, and when it is determined that the reading surface faces the first reading unit in the front/back side determination processing mode, the control unit that controls the transport load adjusting unit makes the transport load smaller than the transport load when the first transport mode is executed.

According to this aspect, when it is determined that the reading surface faces the first reading unit in the front/back side determination processing mode, the control unit that controls the transport load adjusting unit makes the transport load smaller than the transport load when the first transport mode is executed, thus the sheet holder can easily enter between the driving roller and the driven roller and can be appropriately transported by the transport unit.

In a fifth aspect of the image reading apparatus according to the fourth aspect, the control unit increases the transport load after a predetermined time after making the transport load smaller than the transport load when the first transport mode is executed.

Since the control unit makes the transport load smaller than the transport load when the first transport mode is executed, and then increases after a predetermined time, the control unit can increase the transport force of the transport unit after reducing the transport load and nipping the sheet holder between the driving roller and the driven roller.

In a sixth aspect of the image reading apparatus according to any one of the third to fifth aspect, the feeding unit includes a feeding roller that feeds a medium, a separation roller that contacts the feeding roller to separate the medium between the feeding roller and the separation roller, and a separation load adjusting unit that adjusts a separation load which is a load by which the separation roller is pressed toward the feeding roller, and when it is determined that the reading surface faces the first reading unit in the front/back side determination processing mode, the control unit that controls the separation load adjusting unit makes the separation load larger than the separation load when the first transport mode is executed.

According to this aspect, when it is determined that the reading surface faces the first reading unit in the front/back side determination processing mode, the control unit that controls the separation load adjusting unit makes the separation load larger than the separation load when the first transport mode is executed, thus it is possible to enhance the effect of assisting the transport by the transport unit by driving the feeding unit when transporting the sheet holder in a correct orientation, that is, the reading surface faces the first reading unit.

A seventh aspect of the image reading apparatus according to any one of the first to sixth aspect, further includes a reading portion displacing unit that displaces the second reading unit in a direction of advancing and retreating with the first reading unit, in which, when it is determined that the reading surface faces the first reading unit in the front/back side determination processing mode, the control unit that controls the reading portion displacing unit displaces the second reading unit in a direction away from the first reading unit.

According to this aspect, there is further provided a reading portion displacing unit that displaces the second reading unit in a direction of advancing and retreating with the first reading unit, in which, when it is determined that the reading surface faces the first reading unit in the front/back side determination processing mode, the control unit that controls the reading portion displacing unit displaces the second reading unit in a direction away from the first reading unit, thus it is possible to adopt a configuration in which the sheet holder in a correct orientation, that is, the reading surface facing the first reading unit, can easily enter between the first reading unit and the second reading unit. It is possible to suppress noise and sliding that occur when the sheet holder enters between the first reading unit and the second reading unit.

In an eighth aspect of the image reading apparatus according to any one of the first to seventh aspect, the detection unit includes a first detection portion and a second detection portion which are between the feeding unit and the transport unit in the medium transport direction and whose positions are different in a width direction intersecting with the medium transport direction, and the first detection portion and the second detection portion detect a tip portion formed asymmetrically with respect to a center in the width direction of the sheet holder as the specific portion.

According to this aspect, the detection unit includes a first detection portion and a second detection portion which are between the feeding unit and the transport unit in the medium transport direction and whose positions are different in a width direction intersecting with the medium transport direction and detects a tip portion formed asymmetrically with respect to a center in the width direction of the sheet holder as the specific portion with the first detection portion and the second detection portion, thus it is possible to determine whether or not the reading surface in the sheet holder faces the first reading unit with an easy configuration.

In a ninth aspect of the image reading apparatus according to any one of the first to seventh aspect, the detection unit detects a mark provided on the sheet holder as the specific portion.

According to this aspect, since the detection unit detects the mark provided on the sheet holder, as the specific portion, it is possible to determine whether or not the reading surface of the sheet holder faces the first reading unit with an easy configuration.

First Embodiment

First, an outline of an image reading apparatus according to an embodiment of the disclosure will be described with reference to drawings. In the present embodiment, as an example of the image reading apparatus, a scanner 1 that can read at least one of the front surface and the back surface of a medium is taken as an example. The scanner 1 is a so-called document scanner that reads an original such as a document.

In an XYZ coordinate system shown in each drawing, an X direction is an apparatus width direction, a Y direction is an apparatus depth direction. A Z direction indicates the height direction. A +Y direction is the front of the apparatus, and a −Y direction is the rear of the apparatus. When viewed from the front of the apparatus, the left direction is a +X direction, and the right direction is a −X direction. A +Z direction is the upper side of the apparatus, and a −Z direction side is the lower side of the apparatus. The direction in which a document P (see FIG. 4) as a medium is fed is called "downstream", and the opposite direction is called "upstream".

Overview of Scanner

Hereinafter, the scanner 1 according to the disclosure will be described with reference to FIGS. 1 to 4. The scanner 1 shown in FIG. 1 includes a casing 2 that includes a first reading unit 5a and a second reading unit 5b as a reading portion 5 (see FIG. 4) that reads the document P. As shown in FIG. 4, a feeding unit 13 and a transport unit 16 are provided inside the casing 2. In FIG. 4, the first reading unit 5a is disposed to read the lower surface of the document P transported along a transport path R, and the second reading unit 5b is disposed to read the upper surface of the document P transported on the transport path R.

As shown in FIG. 1, the casing 2 includes a lower unit 3 that constitutes the lower portion of the casing 2 and an upper unit 4 that constitutes the upper portion of the casing 2. The upper unit 4 is rotated with respect to a rotation shaft 4a shown in FIG. 4 and is configured to be switchable between a closed state of covering the lower unit 3 as shown by a solid line in FIG. 4 and an open state of opening the lower unit 3 as shown by a two-dot chain line in FIG. 4. By opening the upper unit 4, a transport path R can be exposed and maintenance inside the casing 2 can be performed. The transport path R in the scanner 1 will be described in detail after the outline of the scanner 1 is described.

Figure 2:
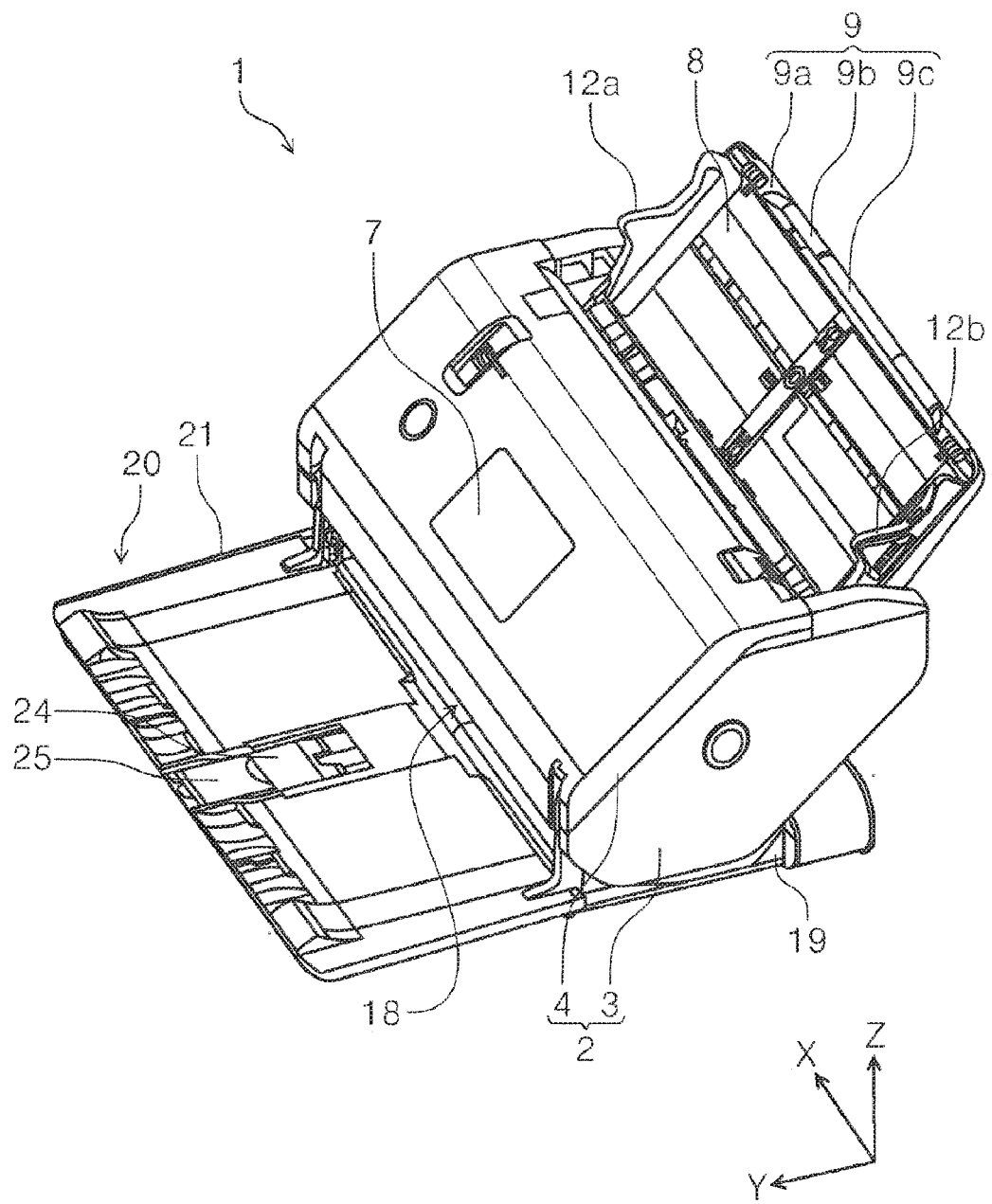
FIG. 2 is an external perspective view of the scanner in which a discharge tray and a feeding tray are in an unfolded state.

The casing 2 is supported by a support member 19 as shown in each of FIGS. 1 to 4. As shown in FIG. 2, a supply portion 6 which is a supply port of the document P to the transport path R shown in FIG. 4 and a paper feeding tray 8 serving as a medium mounting portion on which the document P fed from the supply portion 6 is mounted are provided at the upper rear portion of the casing 2. A plurality of cut sheets can be stacked and mounted as a bundle on the paper feeding tray 8 as the document P. A booklet G (refer to FIGS. 6 and 7) such as a passport or a passbook can be set to be placed in a sheet holder 40 as the document P on the feeding tray 8. The feeding tray 8 is provided so as to be rotatable with respect to the casing 2 around a rotation shaft 8a shown in FIG. 4.

In addition, a discharge portion 18 that is a discharge port for discharging the document P after being read by the reading portion 5 and a discharge tray 20 that receives the document P discharged from the discharge portion 18 are provided at the lower front portion of the casing 2. The discharge tray 20 is provided so as to be rotatable with respect to the casing 2 around a rotation shaft 20a shown in FIG. 4.

The scanner 1 is configured to be switchable between a housed state in which both the feeding tray 8 and the discharge tray 20 cover a part of the casing 2 as shown in FIG. 1 and an unfolded state in which the document P can be mounted on both the feeding tray 8 and the discharge tray 20 as shown in FIG. 2. When the scanner 1 is not in use, the apparatus can be made compact while being used as a cover for the casing 2 by placing the feeding tray 8 and the discharge tray 20 in the housed state.

Figure 5:
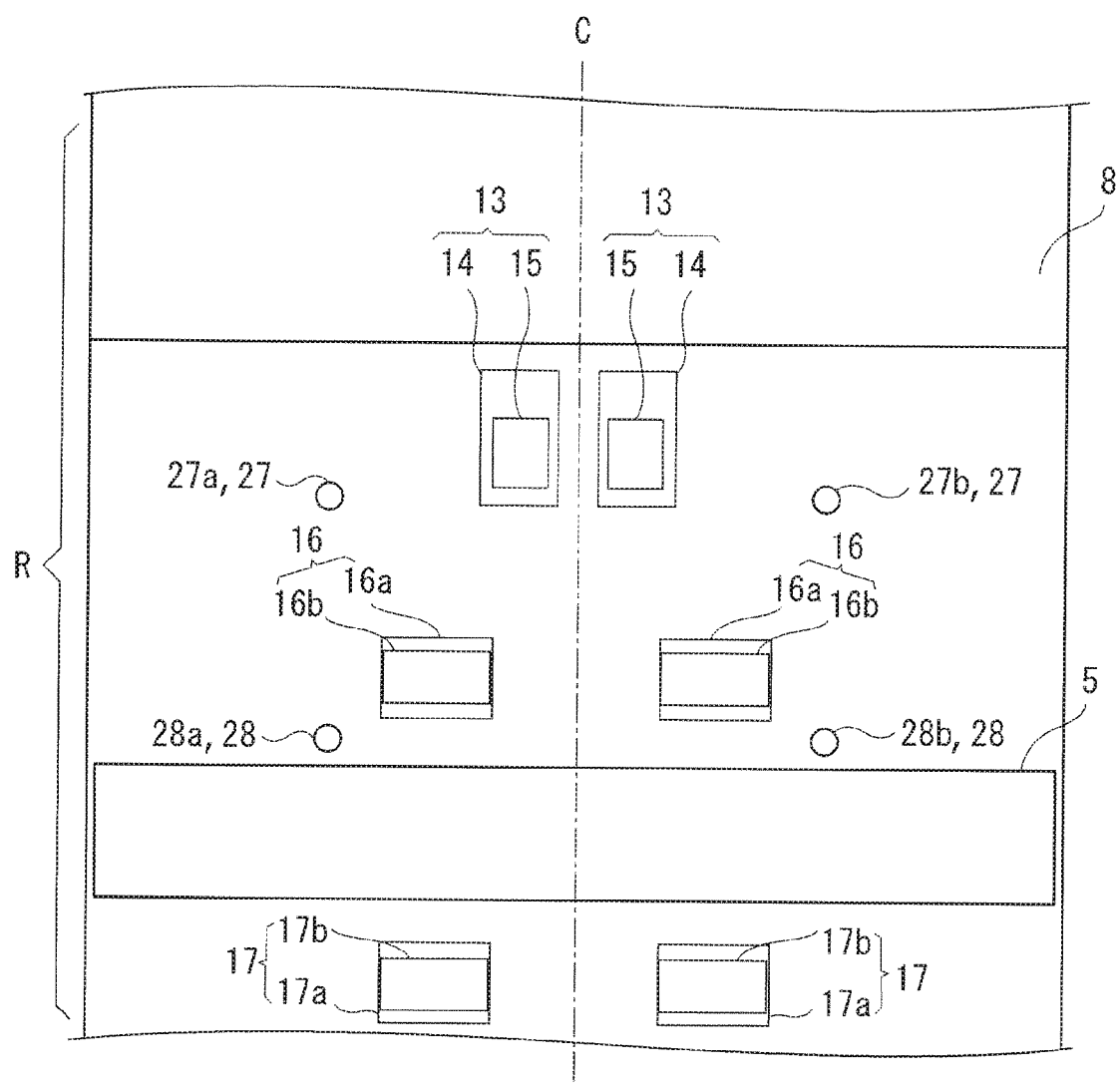
FIG. 5 is a schematic plan view showing a main part of a transport path in the scanner.

As shown in FIG. 2, the feeding tray 8 is provided with edge guides 12a and 12b that guide side edges in the width direction (X-axis direction) intersecting with a medium transport direction of the document P. The edge guides 12a and 12b are provided to be slidable in the X-axis direction according to the size of the document P. In the embodiment, the edge guides 12a and 12b are configured so that the −X side edge guide 12b moves in the opposite direction following the X movement of the +X side edge guide 12a, by a known rack and pinion mechanism. The feeding tray 8 is configured such that the document P is aligned at the center in the width direction and is fed by a so-called center feeding method by a later-described feeding roller 14 provided in the center region in the apparatus width direction as shown in FIG. 5.

Figure 3:
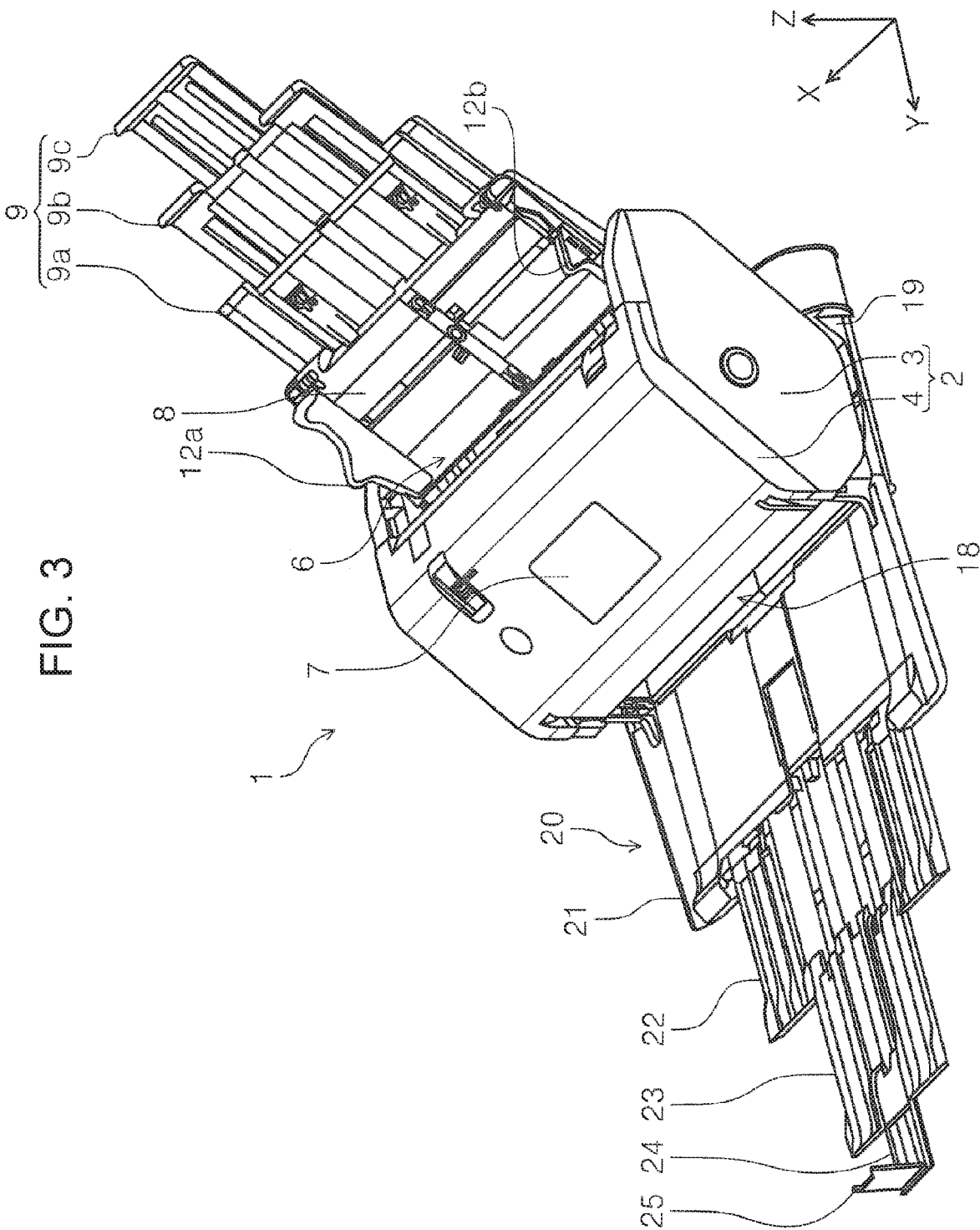
FIG. 3 is an external perspective view of the scanner in a state in which an auxiliary discharge tray and an auxiliary feeding tray are pulled out from the state of the scanner shown in FIG. 2.
Figure 4:
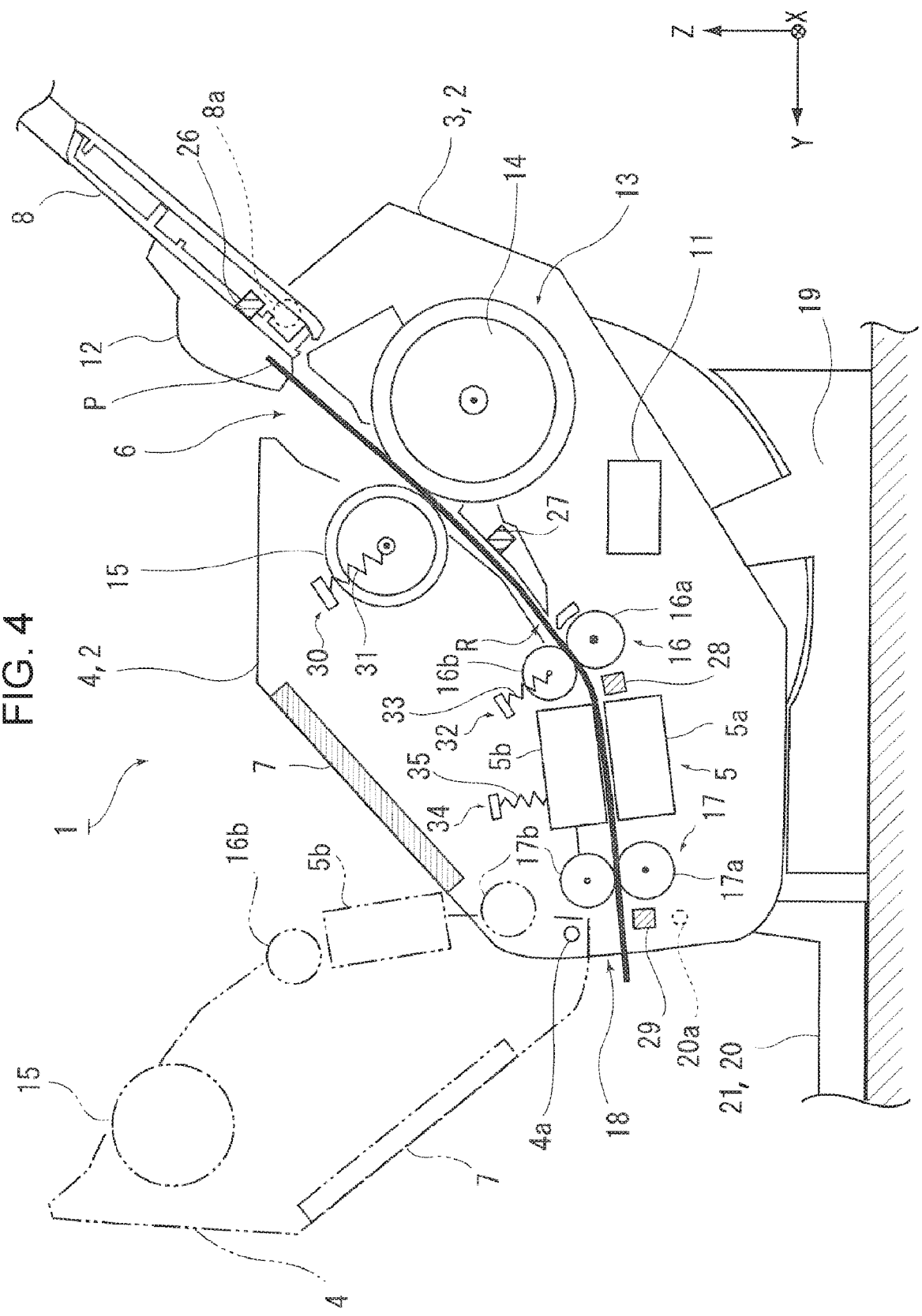
FIG. 4 is a side sectional view showing a transport path in the scanner.

The feeding tray 8 includes an auxiliary feeding tray 9 that is switchable between a state pulled out from the feeding tray 8 as shown in FIG. 3 and a state housed in the feeding tray 8 as shown in FIG. 2. The auxiliary feeding tray 9 is configured by three trays, a first auxiliary feeding tray 9a, a second auxiliary feeding tray 9b, and a third auxiliary feeding tray 9c. When the auxiliary feeding tray 9 is pulled out as shown in FIG. 3, the length of the feeding tray 8 can be extended. When the scanner 1 is in the housed state shown in FIG. 1, the auxiliary feeding tray 9 is housed in the feeding tray 8.

As shown in FIG. 3, the discharge tray 20 includes a first tray 21 that receives the document P discharged from the discharge portion 18, and a second tray 22 that can be expanded and housed with respect to the first tray 21. The second tray 22 includes a third tray 23 that can be expanded and housed with respect to the second tray 22. The third tray 23 includes a fourth tray 24 that can be expanded and housed with respect to the third tray 23. The length of the discharge tray 20 in the medium discharge direction can be further extended by the second tray 22, the third tray 23, and the fourth tray 24. At the tip of the fourth tray 24, there is provided a restricting portion 25 that is formed so as to be foldable with respect to the fourth tray 24 and restricts the movement of the document P mounted on the discharge tray 20 in the +Y direction.

As shown in FIGS. 2 and 3, the upper unit 4 is provided with an operation panel 7 for displaying contents related to apparatus operations such as reading setting contents. The operation panel 7 can be configured as a touch panel as an example, and it is possible to perform operations such as various settings, reading, and the like in addition to displaying the contents related to the apparatus operation. The operation of the scanner 1 is controlled by the control unit 11 shown in FIG. 4.

About Media Transport Path

Hereinafter, the configuration of the scanner 1 will be described in more detail while mainly describing the transport path R in the scanner 1 with reference to FIG. 4. The feeding unit 13 that sends out a medium from the feeding tray 8 (medium mounting portion) on which the document P is mounted to the transport path R along which the document P is transported, the transport unit 16 that is provided downstream of the feeding unit 13 in the medium transport direction and transports the document P, and the reading portion 5 are disposed in order from the upstream in the medium transport direction on the transport path R along which the document P is supplied from the feeding tray 8.

The feeding unit 13 includes the feeding roller 14 that feeds the document P, and a separation roller 15 that contacts the feeding roller 14 to separate the document P from the feeding roller 14. The separation roller 15 is provided at a position facing the feeding roller 14 in FIG. 4. As shown in FIG. 5, the feeding roller 14 and the separation roller 15 are disposed symmetrically at the both sides of a center C in the apparatus width direction.

As shown in FIG. 4, the separation roller 15 in the feeding unit 13 is pressed toward the feeding roller 14 by a first pressing unit 31 such as a spring. The feeding unit 13 includes a separation load adjusting unit 30 that adjusts a separation load which is a load by which the separation roller 15 is pressed toward the feeding roller 14. The separation load adjusting unit 30 can be configured to use, as an example, a motor and an eccentric cam that converts a driving force of the motor into an advance/retreat operation of the separation roller 15 with respect to the feeding roller 14, bring the eccentric cam into contact with the upper end of the first pressing unit 31, and rotate the eccentric cam to adjust the length of the first pressing unit 31.

The transport unit 16 includes a driving roller 16a driven by a driving source and a driven roller 16b that rotates following the rotation of the driving roller 16a. As shown in FIG. 5, the transport unit 16 is disposed symmetrically on both sides of the center C in the apparatus width direction.

In the transport unit 16, the driven roller 16b is pressed toward the driving roller 16a by the second pressing unit 33 such as a spring, as shown in FIG. 4. The transport unit 16 includes a transport load adjusting unit 32 that adjusts a transport load, which is a load pressed by which the driven roller 16b is pressed toward the driving roller 16a. For example, the transport load adjusting unit 32 can be performed by using the same configuration as the above-described separation load adjusting unit 30, that is, using a motor and an eccentric cam, bringing the eccentric cam into contact with the upper end of the second pressing unit 33, and adjusting the length of the second pressing unit 33 by rotating the eccentric cam.

The reading portion 5 will be described later. A discharge roller pair 17 is provided downstream of the reading portion 5 in the medium transport direction. The discharge roller pair 17 is a discharge unit that discharges the document P after being read by the reading portion 5 from the casing 2, and includes a discharge driving roller 17a and a discharge driven roller 17b that are driven by a drive source. As shown in FIG. 5, the discharge roller pair 17 is disposed symmetrically on both sides of the center C in the apparatus width direction.

The feeding roller 14, the driving roller 16a, and the discharge driving roller 17a are provided to be rotatable with respect to the lower unit 3. The separation roller 15, the driven roller 16b, and the discharge driven roller 17b provided at a position facing the feeding roller 14 are provided to be rotatable with respect to the upper unit 4.

The documents P mounted on the feeding tray 8 are picked up by the feeding roller 14, separated into a single sheet between the feeding roller 14 and the separation roller 15, and then sent toward the transport unit 16. Specifically, the document P is fed downstream by the feeding roller 14 rotating while contacting the surface of the document P facing the feeding tray 8, that is, the lower surface. Therefore, when a plurality of documents P are set on the feeding tray 8 in the scanner 1, the documents are fed downstream from the lower document P in order.

The document P fed by the feeding unit 13 is transported toward the reading portion 5 by the transport unit 16. The reading portion 5 includes a first reading unit 5a that is provided downstream of the transport unit 16 in the medium transport direction and reads the document P transported along the transport path R, whose position with respect to the transport path R is fixed, and a second reading unit 5b that is provided to face the first reading unit 5a across the transport path R and reads the document P transported along the transport path R. As an example, the first reading unit 5a and the second reading unit 5b are configured as a contact image sensor module (CISM).

The first reading unit 5a is provided to be fixed to the lower unit 3. The second reading unit 5b is provided in the upper unit 4 and is configured to be displaceable in a direction of advancing and retreating with respect to the first reading unit 5a. As shown in FIG. 5, the first reading unit 5a and the second reading unit 5b are formed in a shape that is long in the apparatus width direction (X-axis direction). As shown in FIG. 4, the first reading unit 5a is provided with a third pressing unit 35 such as a spring. The second reading unit 5b is provided with a reading portion displacing unit 34 that displaces the second reading unit 5b in the direction of advancing and retreating with respect to the first reading unit 5a. The reading portion displacing unit 34 can be performed by using a motor and an eccentric cam as an example, as in the case of the separation load adjusting unit 30 and the transport load adjusting unit 32, bringing the eccentric cam into contact with the upper end of the third pressing unit 35, and adjusting the length of the third pressing unit 35 by rotating the eccentric cam.

The first reading unit 5a reads the surface facing downward in the document P, and the second reading unit 5b reads the opposite surface, that is, the surface facing upward in the document P. After at least one surface of the document P is read by the reading portion 5, the document P is nipped by the discharge roller pair 17 located downstream of the reading portion 5 and is discharged from the discharge portion 18.

In the embodiment, the feeding roller 14, the separation roller 15, the driving roller 16a, and the discharge driving roller 17a are rotationally driven by a driving source (not shown). These rollers can be configured to be driven by two or more driving sources in addition to the configuration driven by the same driving source. In the embodiment, as an example, the separation roller 15, the driving roller 16a, and the discharge driving roller 17a are driven by a common driving source, and the feeding roller 14 is driven by another driving source.

In addition, a plurality of medium detection portions that detect the document P are provided in the transport path R shown in FIG. 2. A first medium detection portion 26 that detects the presence or absence of the document P mounted on the feeding tray 8 is provided in the mounting area of the document P on the feeding tray 8 upstream of the feeding unit 13. A second medium detection portion 27, a third medium detection portion 28, and a fourth medium detection portion 29 are provided in this order on the downstream of the feeding unit 13, the downstream of the transport unit 16, and the downstream of the discharge roller pair 17. The position of the document P in a medium feeding direction can be detected by the second medium detection portion 27, the third medium detection portion 28, and the fourth medium detection portion 29. Although not shown in the drawing, a double feed detection portion that detects double feed in which a plurality of documents P are transported in an overlapping manner can be provided upstream of the transport unit 16.

As the first medium detection portion 26, the second medium detection portion 27, the third medium detection portion 28, and the fourth medium detection portion 29, for example, an optical sensor including a light emitting portion that emits light and a light receiving portion that receives reflected light of light emitted from the light emitting portion can be used. In addition to the optical sensor, it is also possible to use an ultrasonic sensor that includes a transmission portion that emits ultrasonic waves and a reception portion that is provided opposite to the transmission portion across the sheet to be transported. It is also possible to use a lever type sensor that detects the displacement of the mechanical lever that is moved by the contact of the transported paper with an optical or electric contact type. As the double feed detection portion, the above-described ultrasonic sensor can be used.

In the embodiment, the second medium detection portion 27 is used as a detection unit that detects the tip portion 43 as a specify portion provided in the sheet holder 40 for specifying the front and back sides of the sheet holder 40 (see FIG. 6) in which the booklet G to be described later is sandwiched. The specification of the front and back sides of the sheet holder 40 by the second medium detection portion 27 will be described in detail when the configuration of the sheet holder 40 is described.

In the scanner 1, in addition to the operation of the feeding unit 13 including the separation load adjusting unit 30, the operation of the transport unit 16 including the transport load adjusting unit 32, the operation of the discharge roller pair 17, and the operation of the reading portion 5 including the reading portion displacing unit 34, operations related to image reading are controlled by the control unit 11.

About Sheet Holder for Booklet

Figure 6:
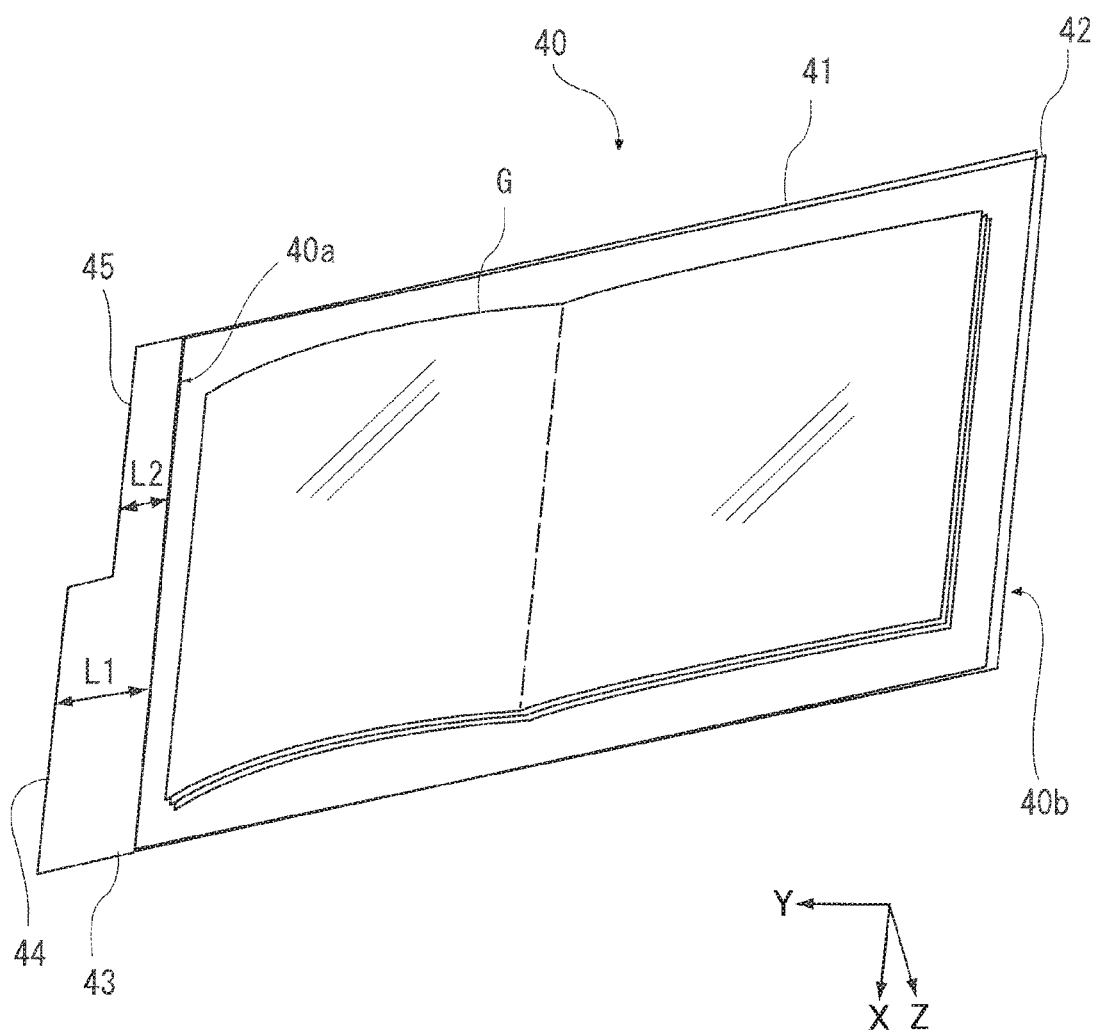
FIG. 6 is a perspective view of a sheet holder in which a booklet is sandwiched.
Figure 7:
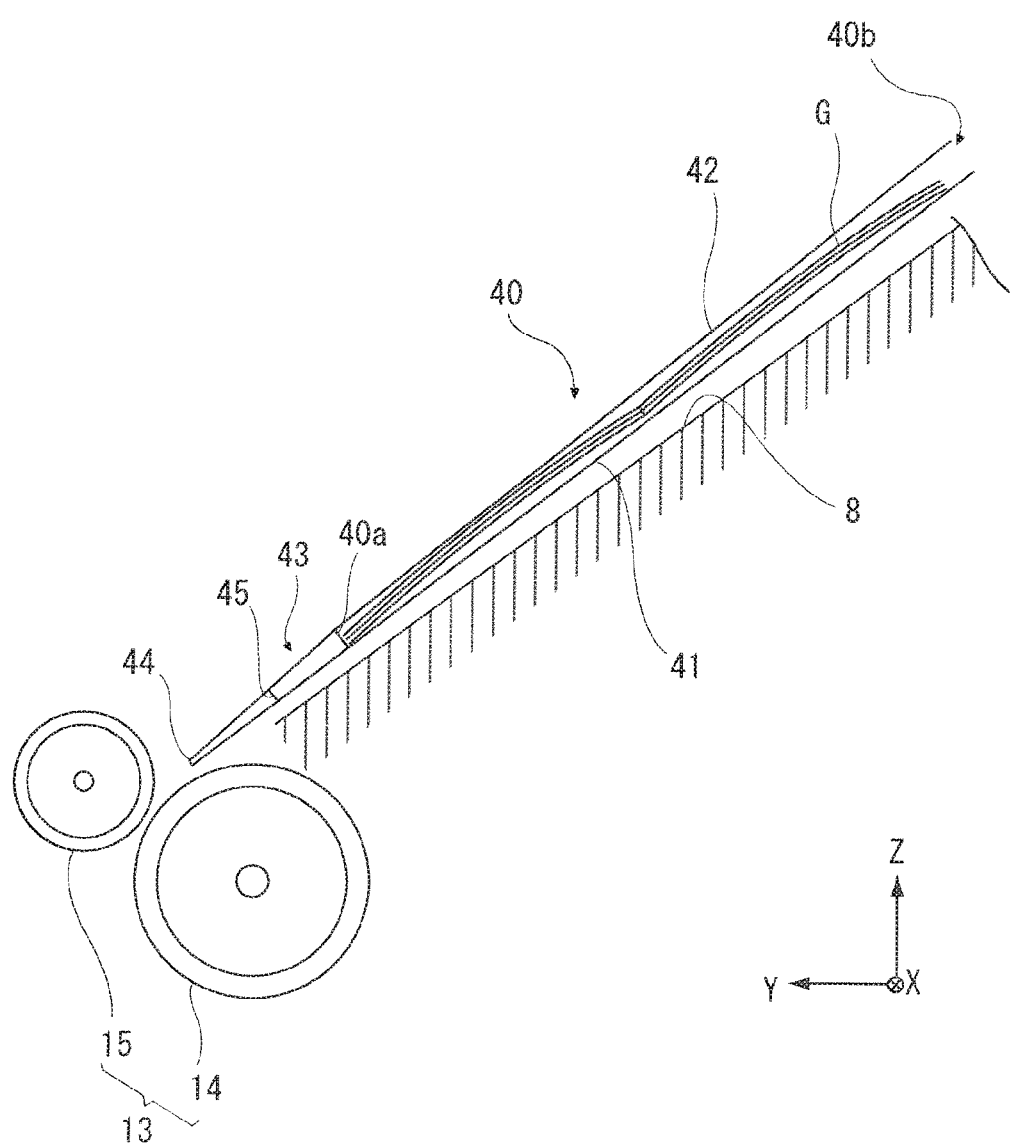
FIG. 7 is a side view of the sheet holder in which the booklet is sandwiched.

As described above, the scanner 1 can transport the booklet G such as a passport or passbook toward the reading portion 5 with the sheet holder 40 shown in FIGS. 6 and 7 in which the booklet G is sandwiched. The sheet holder 40 is configured so that the booklet G can be sandwiched between a front sheet 41 and a back sheet 42. In the front sheet 41 and the back sheet 42, an end portion 40a of the region that accommodates the booklet G is closed and an end portion 40b is opened. The sheet holder 40 may have a shape in which an end portion 40b is closed, but in the embodiment, it is easy to insert and remove the booklet G with respect to the sheet holder 40 by opening the end portion 40b.

The front sheet 41 is formed of a colorless and transparent resin material. As an example, the back sheet 42 and the tip portion 43 described later are formed of a white opaque resin material. The back sheet 42 may be colorless and transparent. The booklet G is inserted into the sheet holder 40 with the reading surface facing the front sheet 41. The reading portion 5 can read the reading surface seen through the colorless and transparent front sheet 41. When reading the booklet G placed in the sheet holder 40, from the viewpoint of the stability of the read image quality, it is preferable to read with the first reading unit 5a whose position with respect to the transport path R is fixed rather than to read with the second reading unit 5b whose position with respect to the transport path R is displaced. Accordingly, the sheet holder 40 is mounted on the feeding tray 8 with the end portion 40a facing downstream in the medium transport direction so that the front sheet 41 faces the first reading unit 5a in a state where the front sheet 41 faces down as shown in FIG. 7.

As shown in FIG. 6, the tip portion 43 formed asymmetrically with respect to the center in the width direction of the sheet holder 40 is provided at the end portion 40a as a specific portion that specifies the front and back sides of the sheet holder 40. More specifically, the tip portion 43 includes a first part 44 having a length L1 from the end portion 40a and a second part 45 having a length L2 that is shorter than the length L1 from the end portion 40a.

In the scanner 1, the tip portion 43 is detected by using the second medium detection portion 27 described above (see FIG. 5) as a detection unit, and the control unit 11 can specify the front and back sides of the sheet holder 40 based on the detection information from the second medium detection portion 27. Hereinafter, with reference to FIGS. 8 and 9, the specification of the front and back sides of the sheet holder 40 based on the detection information by the second medium detection portion 27 will be described.

As shown in FIG. 5, the second medium detection portion (detection unit) 27 includes a first detection portion 27a and a second detection portion 27b that are located between the feeding unit 13 and the transport unit 16 in the medium transport direction and whose positions are different in the width direction intersecting with the medium transport direction. The second medium detection portion 27 detects the tip portion 43 with the first detection portion 27a and the second detection portion 27b. In the embodiment, the first detection portion 27a and the second detection portion 27b are disposed symmetrically with respect to the center C in the width direction.

Figure 8:
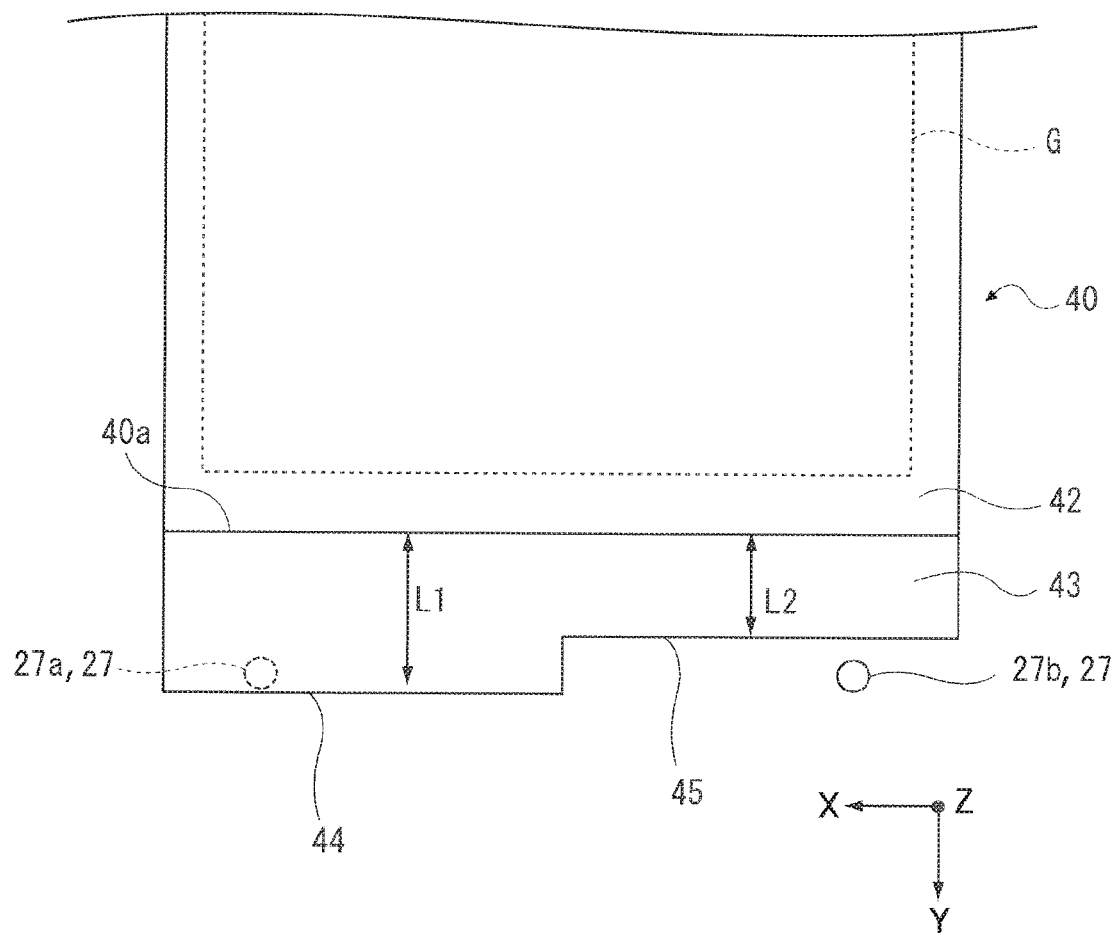
FIG. 8 is a view showing the determination of the front and back of the sheet holder based on the detection information of a detection unit, and shows a state in which the front sheet of the sheet holder faces a first reading unit.

When the front sheet 41 is set to face the first reading unit 5a as shown in FIG. 7, that is, when the front sheet 41 faces down and the back sheet 42 faces up, in a plan view with the sheet holder 40 facing down in the medium transport direction as shown in FIG. 8, the first part 44 of the tip portion 43 is located in the +X direction, and the second part 45 is located in the −X direction. When the sheet holder 40 is fed, after the first part 44 having a long length in the medium transport direction from the end portion 40a is first detected by the first detection portion 27a, and then the sheet holder 40 is further fed by the difference between the length L1 and the length L2, the second part 45 is detected by the second detection portion 27b. At this time, the control unit 11 can determine that the front sheet 41 faces down, that is, the reading surface faces the first reading unit 5a.

Figure 9:
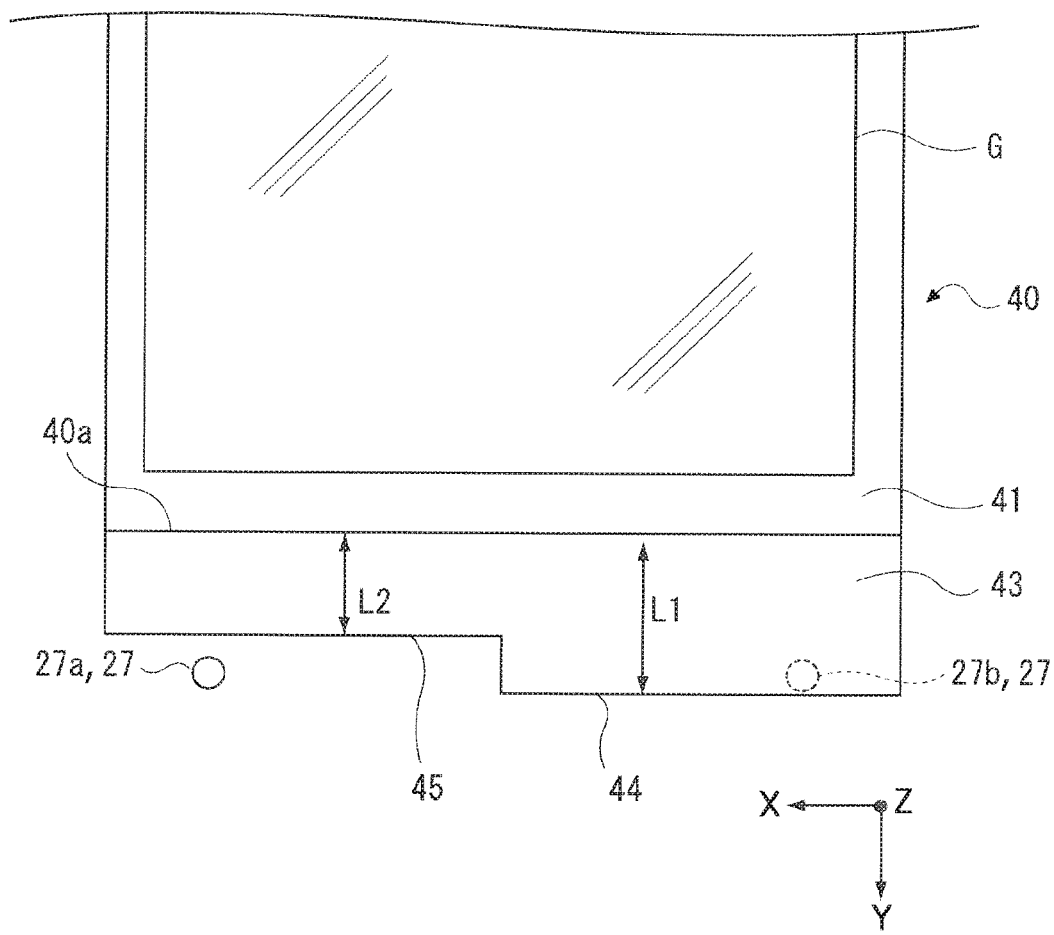
FIG. 9 is a view showing the determination of the front and back of the sheet holder based on the detection information of a detection unit, and shows a state in which the back sheet of the sheet holder faces a first reading unit.

On the other hand, when the front sheet 41 is set to face the second reading unit 5b, that is, when the front sheet 41 faces up and the back sheet 42 faces down, in a plan view with the sheet holder 40 facing down in the medium transport direction as shown in FIG. 9, the first part 44 of the tip portion 43 is located in the −X direction, and the second part 45 is located in the +X direction. When the sheet holder 40 is fed, after the first part 44 having a long length in the medium transport direction from the end portion 40a is first detected by the second detection portion 27b, and then the sheet holder 40 is further fed by the difference between the length L1 and the length L2, the second part 45 is detected by the first detection portion 27a. At this time, the control unit 11 can determine that the front sheet 41 faces upward, that is, the reading surface faces the second reading unit 5b.

The positions of the first detection portion 27a and the second detection portion 27b are the same in the medium transport direction in the embodiment, but may be provided so that the positions in the medium transport direction may be different. If the difference in position in the medium transport direction is known in advance, the front and back sides of the sheet holder 40 can be determined as described above.

As described above, the orientation of the reading surface of the booklet G can be easily determined by detecting a tip portion 53 of the sheet holder 40 with the first detection portion 27a and the second detection portion 27b. That is, it is possible to determine whether the reading surface of the booklet G is read by the first reading unit 5a or the second reading unit 5b.

In the embodiment, the third medium detection portion 28 provided between the transport unit 16 and the reading portion 5 also includes two detection portions 28a and 28b whose positions are different in the width direction as shown in FIG. 5. It is also possible to use the third medium detection portion 28 as a detection means for specifying the front and back sides of the sheet holder 40. When determining the front and back sides of the sheet holder 40 by the second medium detection portion 27, the third medium detection portion 28 may be configured by a single detection unit, and in that case, may be disposed at the center C (see FIG. 5) in the apparatus width direction.

The tip portion 43 is formed in the taper shape by side view as shown in FIG. 7. Since the booklet G sandwiched between the front sheet 41 and the back sheet 42 is thicker than the cut sheet, the booklet G is hardly nipped between the feeding roller 14 and the separation roller 15. By providing the taper-shaped tip portion 43 in the sheet holder 40, the sheet holder 40 can be easily nipped between the feeding roller 14 and the separation roller 15.

Control by Control Unit

Figure 10:
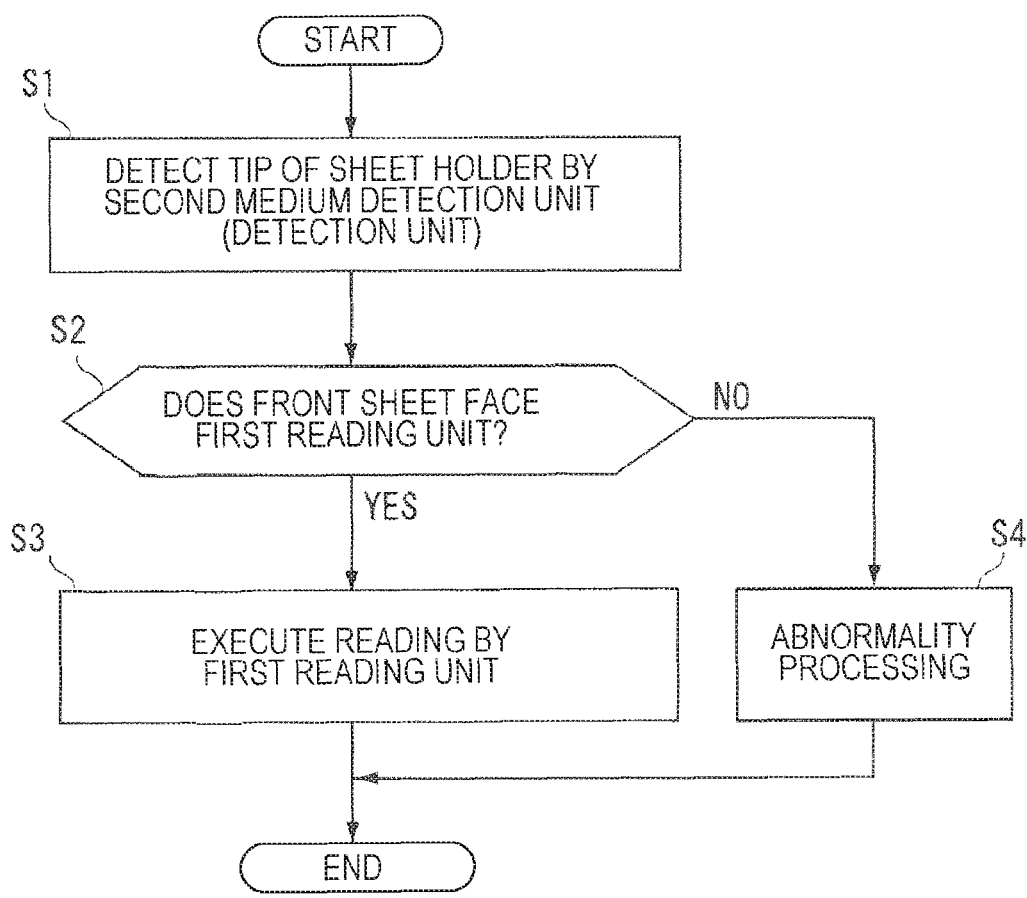
FIG. 10 is a flowchart showing a front/back side determination processing mode.

The scanner 1 determines whether or not the front sheet 41 as a reading surface in the sheet holder 40 faces the first reading unit 5a based on the detection information of the second medium detection portion 27 (detection unit) described above, and it is possible to execute the front/back side determination processing mode for performing processing based on the determination. It is possible to perform appropriate processing according to the front and back sides of the sheet holder 40 by performing the front/back side determination processing mode, thereby obtaining a good reading result. A specific example of the front/back side determination processing mode will be described below based on the flowchart shown in FIG. 10.

When the sheet holder 40 in which the booklet G as a document is sandwiched is fed, the tip portion 43 of the sheet holder 40 is detected by the second medium detection portion 27 in step S1. Based on the detection information in step S1, it is determined in step S2 whether or not the front sheet 41 of the sheet holder 40 faces the first reading unit 5a. The determination as to whether or not the front sheet 41 of the sheet holder 40 faces the first reading unit 5a based on the detection information of the second medium detection portion 27 is as described above with reference to FIGS. 8 and 9.

If YES is determined in step S2, that is, if it is determined that the front sheet 41 as a reading surface of the sheet holder 40 faces the first reading unit 5a, as processing based on the determination, step S3 is executed to perform image reading by the first reading unit 5a as it is.

On the other hand, if NO is determined in step S2, that is, if it is determined that the front sheet 41 as a reading surface of the sheet holder 40 does not face the first reading unit 5a and the back sheet 42 faces the first reading unit 5a, step S4 is executed to perform abnormality processing. As the abnormal processing, for example, the reading is stopped without reading by the second reading unit 5b that the front sheet 41 faces, and it is possible to display a warning on the operation panel 7 (see FIG. 2), or issue a warning signal by sound or lighting or blinking of a warning lamp. The operation panel 7 can be configured such that whether to stop reading or continue reading by the second reading unit 5b is selected after a warning display or warning signal.

The abnormal processing can be configured such that, after reading by the second reading unit 5b, a warning display or a warning signal is issued to notify that reading has been performed by the second reading unit 5b and prompt the user to read again by resetting the sheet holder 40. The abnormal processing can be configured such a warning display or a warning signal is issued to notify that the sheet holder 40 is ejected without reading by the second reading unit 5b and the orientation of the reading surface is not correct and prompt the user to read again by resetting the sheet holder 40.

As described above, the control unit 11 executes reading by the first reading unit 5a when the first reading unit 5a whose position is fixed and the reading surface face each other in the front/back side determination processing mode, and executes abnormality processing when the reading surface does not face the first reading unit 5a, thus it is possible to make the user aware that the sheet holder 40 has been set in an orientation in which the reading surface is read by the second reading unit 5b that can be displaced.

The control unit 11 also includes a first transport mode in which driving of the feeding unit 13 is stopped when transport of the document P by the transport unit 16 starts after the document P is sent to the transport path R by the feeding unit 13, and a second transport mode in which the feeding unit 13 continues to be driven for a predetermined period after the document P is sent out to the transport path R by the feeding unit 13 and then the transport of the document P by the transport unit 16 is started.

In the first transport mode, when transport of the document P by the transport unit 16 is started after the document P is sent out to the transport path R by the feeding unit 13, the driving of the feeding unit 13 is stopped and the document P is transported only by the transport unit 16. A plurality of documents P are mounted on the feeding tray 8 by transporting the documents P in the first transport mode, and the documents P can be suitably separated and transported when feeding the documents P while separating documents one by one.

In the second transport mode, after the document P is sent out to the transport path R by the feeding unit 13, the feeding unit 13 continues to be driven for the predetermined period after the transport of the document P by the transport unit 16 is started, thus it is possible to assist the transport by the transport unit 16 by driving the feeding unit 13 when a document having a thickness such as the sheet holder 40 is transported as the document P. In particular, since the thickness of the sheet holder 40 increases abruptly at the end portion 40a (see FIG. 7) of the region that accommodates the booklet G, after the tip portion 43 of the sheet holder 40 is nipped by the transport unit 16, a large transport force is required when the end portion 40a enters the transport unit 16, but as described above, the feeding unit 13 assists the transport of the sheet holder 40, whereby the sheet holder 40 can be appropriately transported downstream in the second transport mode. In the embodiment, the front/back side determination processing mode is performed when the second transport mode is executed. Thus, when performing reading using the sheet holder 40 in the second transport mode, it is possible to perform appropriate processing according to the front and back sides of the sheet holder 40 and obtain a good reading result by performing the front/back side determination processing mode. The user can select the first transport mode and the second transport mode, for example, on the operation panel 7.

When it is determined that the reading surface, that is, the front sheet 41 faces the first reading unit 5a in the front/back side determination processing mode, the control unit 11 can be configured to control the separation load adjusting unit 30 shown in FIG. 4 to make the separation load in the feeding unit 13 larger than the separation load when the first transport mode is executed. With this configuration, when it is determined that the reading surface, that is, the front sheet 41 faces the first reading unit 5a in the front/back side determination processing mode, that is, when it is determined that the sheet holder 40 is in an orientation in which the reading surface can be read by the first reading unit 5a, it is possible to enhance the effect of assisting the transport by the transport unit 16 by driving the feeding unit 13.

In the embodiment, the sheet holder 40 shown in FIG. 6 has the end portion 40b opened, but when using a sheet holder in which the end portion 40b of the sheet holder 40 is closed, the control unit 11 can perform the following control. When it is determined that the reading surface faces the first reading unit 5a in the front/back side determination processing mode, the control unit 11 rotates the separation roller 15 in the direction in which the document P is fed in the transport direction, that is, in the clockwise direction in plan view of FIG. 4. As a result, it is possible to further enhance the effect of assisting the transport by the transport unit 16 by driving the feeding unit 13.

When it is determined that the front sheet 41 from which the reading surface is visible faces the first reading unit 5a in the front/back side determination processing mode, the control unit 11 can be configured to control the transport load adjusting unit 32 (see FIG. 4) to make the transport load in the transport unit 16 smaller than the transport load when the first transport mode is executed. With this configuration, when it is determined that the reading surface, that is, the front sheet 41 faces the first reading unit 5a in the front/back side determination processing mode, that is, when it is determined that the sheet holder 40 is in an orientation in which the reading surface can be read by the first reading unit 5a, the sheet holder 40 can easily enter between the driving roller 16a and the driven roller 16b shown in FIG. 4. Accordingly, the sheet holder 40 can be appropriately transported by the transport unit 16.

The control unit 11 may be configured to increase the transport load after a predetermined time after making the transport load smaller than the transport load when executing the first transport mode. When the transport load decreases, that is, when the nip pressure between the driving roller 16a and the driven roller 16b decreases, the sheet holder 40 easily enters between the driving roller 16a and the driven roller 16b, but the transport force by the transport unit 16 may be insufficient. The control unit 11 reduces the transport load of the transport unit 16 once and then increases the transport load after the predetermined time, thereby reducing the transport load and easily entering the sheet holder 40 between the driving roller 16a and the driven roller 16b, and thereafter, the transport force by the transport unit 16 can be increased and the sheet holder 40 can be reliably transported.

The predetermined time from when the transport load is reduced to when the transport load is increased again is set such that the sheet holder 40 is securely nipped between the driving roller 16a and the driven roller 16b by reducing the transport load. The increased transport load after the increase may be returned to the same size as the load before the reduction, that is, the same as the transport load when the first transport mode is executed, or may not be less than the transport load or exceed the transport load when the first transport mode is executed.

When it is determined that the reading surface faces the first reading unit 5a in the front/back side determination processing mode, the control unit 11 can be configured to control the reading portion displacing unit 34 shown in FIG. 4 to displace the second reading unit 5b in a direction away from the first reading unit 5a. With this configuration, when it is determined that the reading surface, that is, the front sheet 41 faces the first reading unit 5a in the front/back side determination processing mode, that is, when it is determined that the sheet holder 40 is in an orientation in which the reading surface can be read by the first reading unit 5a, it is possible to adopt a configuration in which the sheet holder 40 can easily enter between the first reading unit 5a and the second reading unit 5b. It is possible to suppress the noise and sliding that occur when the sheet holder 40 enters between the first reading unit 5a and the second reading unit 5b.

Modification Example of Sheet Holder

FIG. 11 shows a sheet holder 50 which is a modification example of the sheet holder. The left diagram in FIG. 11 shows a state in which the front sheet 51 faces down to face the first reading unit 5a (see FIG. 4) and the back sheet 52 faces up. The right diagram in FIG. 11 shows a state in which the back sheet 52 faces down to face the first reading unit 5a and the front sheet 51 faces up.

Similar to the sheet holder 40, the sheet holder 50 is configured such that the booklet G can be sandwiched between the colorless and transparent front sheet 51 and the white opaque back sheet 52. In the front sheet 51 and the back sheet 52, the end portion 50*a* of the region for accommodating the booklet G is closed, and the opposite end portion (not shown) is open. The end portion 50*a* is provided with the tip portion 53 on which a front mark M1 and a back mark M2 are formed as specific portions for specifying the back and front side of the sheet holder 50.

As shown in the right diagram of FIG. 11, four lines are formed as the front mark M1 on a front surface 53*a* facing the same direction as the front sheet 51 in the tip portion 53. As shown in the left diagram of FIG. 11, two lines are formed as the back mark M2 on the back surface 53*b* facing the same direction as the back sheet 52 in the tip portion 53. The mark is not limited to a pattern using lines, and may be a mark having a specific shape. The specific portion formed by the unevenness can also be provided in at least one of the front surface 53*a* and the back surface 53*b*. It is possible to determine the front and back sides of the sheet holder 50 by detecting the front mark M1 and the back mark M2 provided on the sheet holder 50 by the detection unit. The mark for specifying the front and back sides of the sheet holder 50 can be provided only on either the front surface 53*a* or the back surface 53*b*.

When the second medium detection portion 27 is an optical sensor including a light emitting unit that emits light and a light receiving unit that receives reflected light of light emitted from the light emitting unit, the second medium detection portion 27 can be used as a detection means for detecting the mark as a specific portion. When the specific portion is a mark, the reading portion 5 can also be used as a detection means for detecting a mark for specifying the front and back sides of the sheet holder 50.

As described above, by adopting a configuration in which the mark provided on the sheet holder 50 as the specific portion is detected by the detection unit, it is possible to determine whether or not the reading surface of the sheet holder 50 faces to the first reading unit 5*a* with an easy configuration.

In addition, the disclosure is not limited to the embodiment described above, and various modifications are possible within the scope of the disclosure described in the claims, and it is needless to say that the modifications are also included in the scope of the disclosure.

What is claimed is:

1. An image reading apparatus comprising:
  a feeding unit that sends out a medium from a medium mounting portion on which the medium is mounted to a transport path along which the medium is transported;
  a transport unit that is provided downstream of the feeding unit in a medium transport direction and transports the medium;
  a first reading unit that is provided downstream of the transport unit in the medium transport direction and reads the medium transported along the transport path, whose position with respect to the transport path is fixed;
  a second reading unit that is provided to face the first reading unit across the transport path and is configured to be displaceable in a direction of advancing and retreating with respect to the first reading unit to read the medium transported along the transport path;
  a detection unit that detects a specific portion provided in a sheet holder for specifying front and back sides of the sheet holder in which a booklet is sandwiched; and
  a control unit that determines whether or not a reading surface in the sheet holder faces the first reading unit based on detection information of the detection unit and executes a front/back side determination processing mode for performing processing based on the determination.

2. The apparatus according to claim 1, wherein
the control unit executes reading by the first reading unit when the reading surface faces the first reading unit in the front/back side determination processing mode, and performs abnormality processing when the reading surface does not face the first reading unit.

3. The apparatus according to claim 1, wherein
the control unit
  includes a first transport mode (separation mode) in which driving of the feeding unit is stopped when transport of the medium by the transport unit is started after the medium is sent out by the feeding unit to the transport path, and a second transport mode (non-separation mode) in which driving of the feeding unit is continued for a predetermined period after the transport of the medium by the transport unit is started after the medium is sent out to the transport path by the feeding unit, and
  performs the front/back side determination processing mode when the second transport mode is executed.

4. The apparatus according to claim 3, wherein
the transport unit includes
  a driving roller driven by a driving source,
  a driven roller that rotates following rotation of the driving roller, and
  a transport load adjusting unit that adjusts a transport load which is a load by which the driven roller is pressed toward the driving roller, and
when it is determined that the reading surface faces the first reading unit in the front/back side determination processing mode, the control unit that controls the transport load adjusting unit makes the transport load smaller than the transport load when the first transport mode is executed.

5. The apparatus according to claim 4, wherein
the control unit increases the transport load after a predetermined time after making the transport load smaller than the transport load when the first transport mode is executed.

6. The apparatus according to claim 3, wherein
the feeding unit includes
  a feeding roller that feeds a medium,
  a separation roller that contacts the feeding roller to separate the medium between the feeding roller and the separation roller, and
  a separation load adjusting unit that adjusts a separation load which is a load by which the separation roller is pressed toward the feeding roller, and
when it is determined that the reading surface faces the first reading unit in the front/back side determination processing mode, the control unit that controls the separation load adjusting unit makes the separation load larger than the separation load when the first transport mode is executed.

7. The apparatus according to claim 1, further comprising:
a reading portion displacing unit that displaces the second reading unit in a direction of advancing and retreating with respect to the first reading unit, wherein
when it is determined that the reading surface faces the first reading unit in the front/back side determination processing mode, the control unit that controls the reading portion displacing unit displaces the second reading unit in a direction away from the first reading unit.

8. The apparatus according to claim 1, wherein
the detection unit includes a first detection unit and a second detection unit which are between the feeding unit and the transport unit in the medium transport direction and whose positions are different in a width direction intersecting with the medium transport direction, and detects a tip portion formed asymmetrically with respect to a center in the width direction of the sheet holder as the specific portion with the first detection unit and the second detection unit.

9. The apparatus according to claim 1, wherein
the detection unit detects a mark provided on the sheet holder as the specific portion.

* * * * *